United States Patent [19]
Block

[11] Patent Number: 4,809,241
[45] Date of Patent: Feb. 28, 1989

[54] METHOD AND APPARATUS FOR ECHO TRANSIT TIME DETERMINATION

[75] Inventor: Peter Block, Ottersberg, Fed. Rep. of Germany

[73] Assignee: Fried. Krupp Gesellschaft mit beschränkter Haftung, Essen, Fed. Rep. of Germany

[21] Appl. No.: 58,932

[22] Filed: Jun. 5, 1987

[30] Foreign Application Priority Data

Jun. 7, 1986 [DE] Fed. Rep. of Germany ....... 3619253
Feb. 19, 1987 [DE] Fed. Rep. of Germany ....... 3705286

[51] Int. Cl.$^4$ .............................................. G01S 9/66
[52] U.S. Cl. .......................................... 367/88; 367/7
[58] Field of Search ................ 367/88, 7; 342/25, 387

[56] References Cited
U.S. PATENT DOCUMENTS

4,207,620 6/1980 Morgera ............................. 367/88

Primary Examiner—Thomas H. Tarcza
Assistant Examiner—Daniel T. Pihulic
Attorney, Agent, or Firm—Spencer & Frank

[57] ABSTRACT

A method and an apparatus for determining the transit time of echoes triggered by exposure of the bottom of a body of water to sonic pulses, in order to improve the echo detection in a received signal intercepted via at least one receiving lobe, particularly for mapping the surface profile of a sea bed. A temporal echo expectation window is opened up on either side of an echo expectation time, the temporal length of the window being dimensioned greater than a maximum echo length to be expected on the basis of an assumed maximum slope of the sea bed and/or a reception angle of the receiving lobe deviating from the vertical. The center of gravity integral is formed from the received signal defined by the echo expectation window, and the time component of the center of gravity is defined as the echo transit time. The echo expectation time is derived from the echo propagation at a known sounding depth. To this end, an edge descriminator is provided, and the echo transit time ascertained by edge discrimination is used as the echo expectation time.

30 Claims, 10 Drawing Sheets

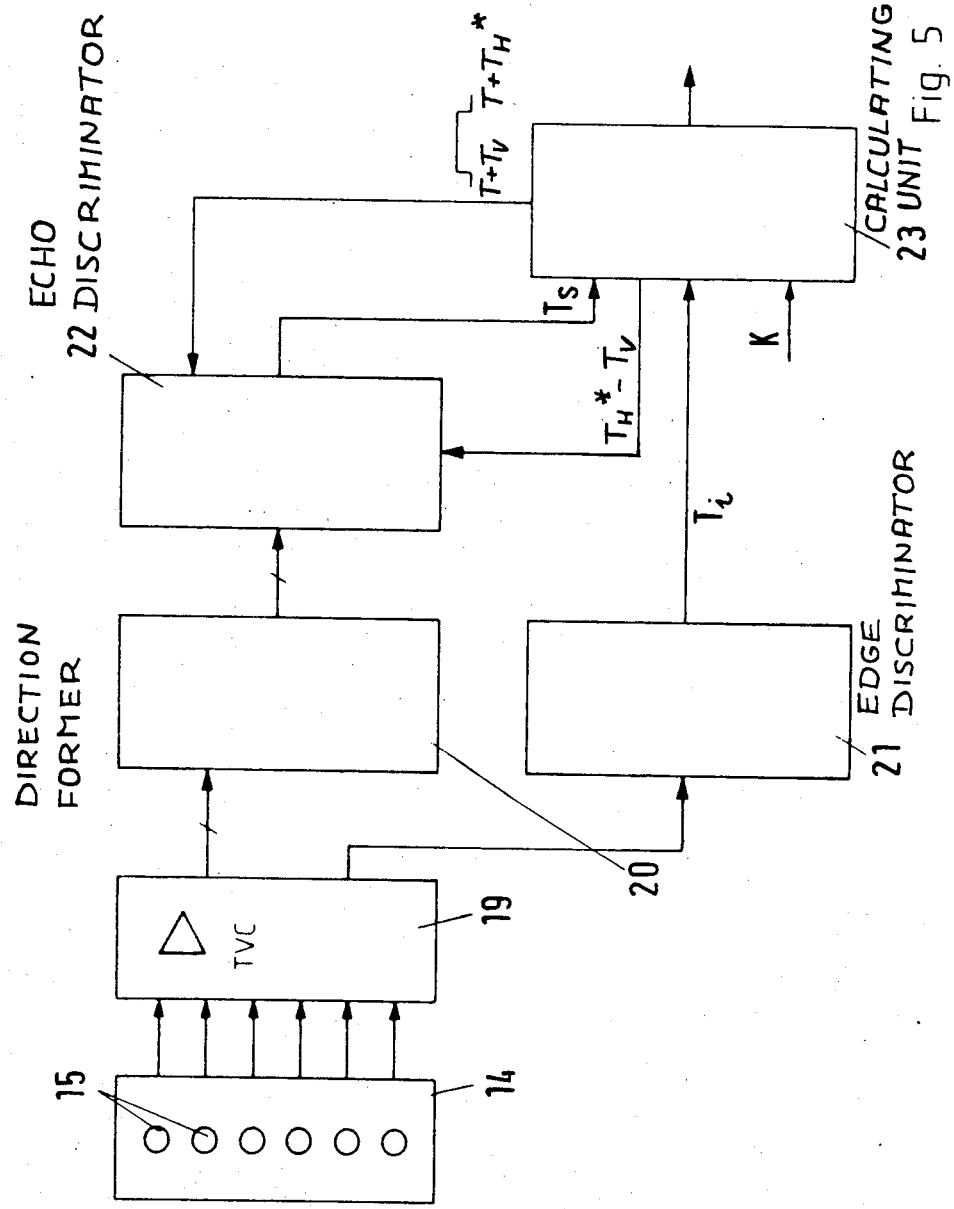

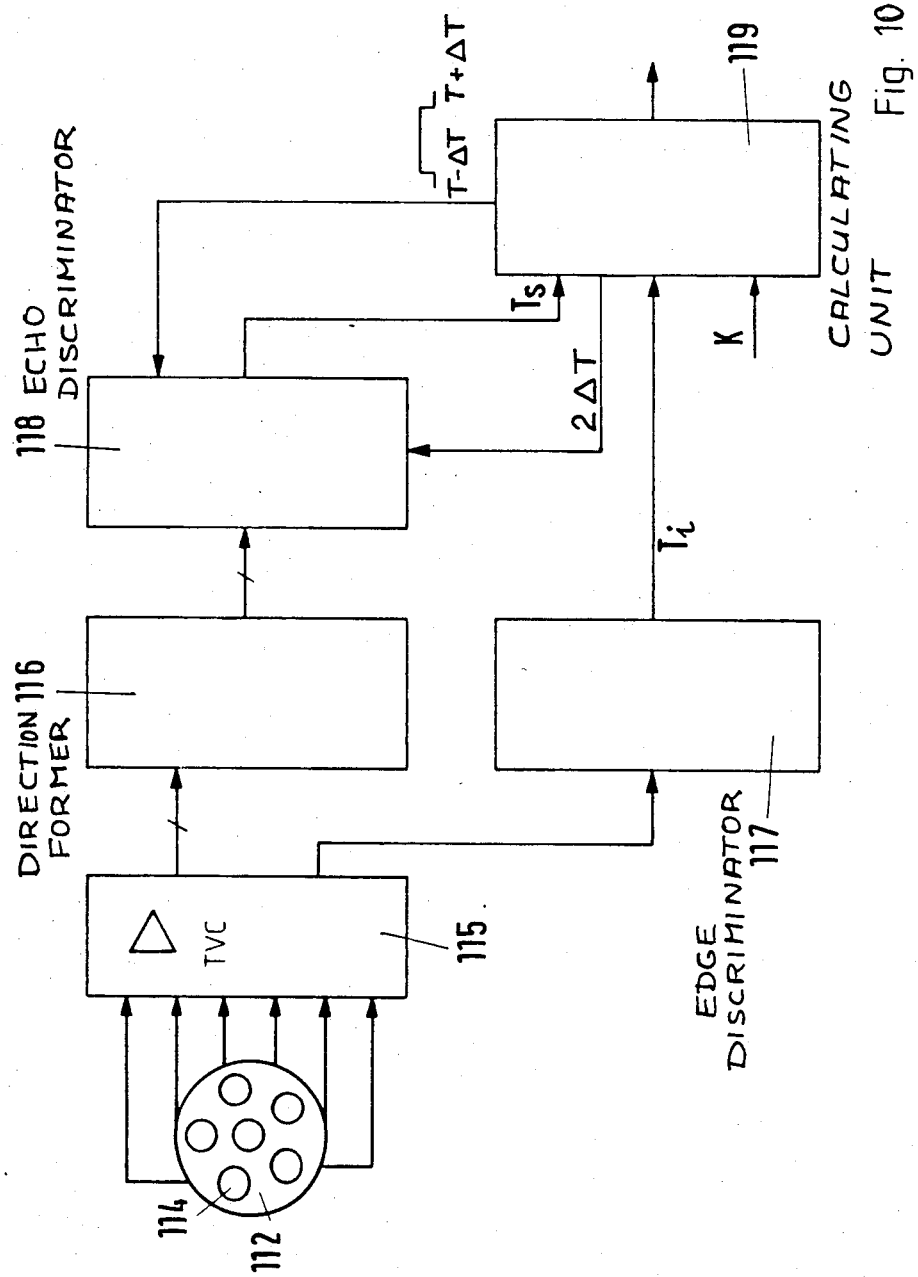

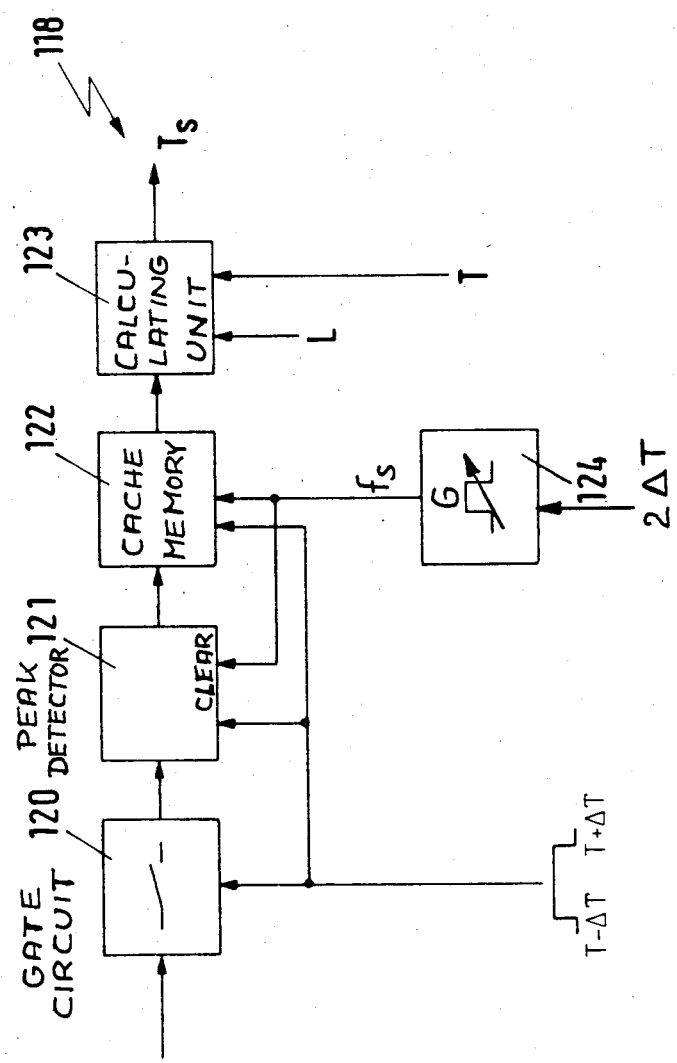

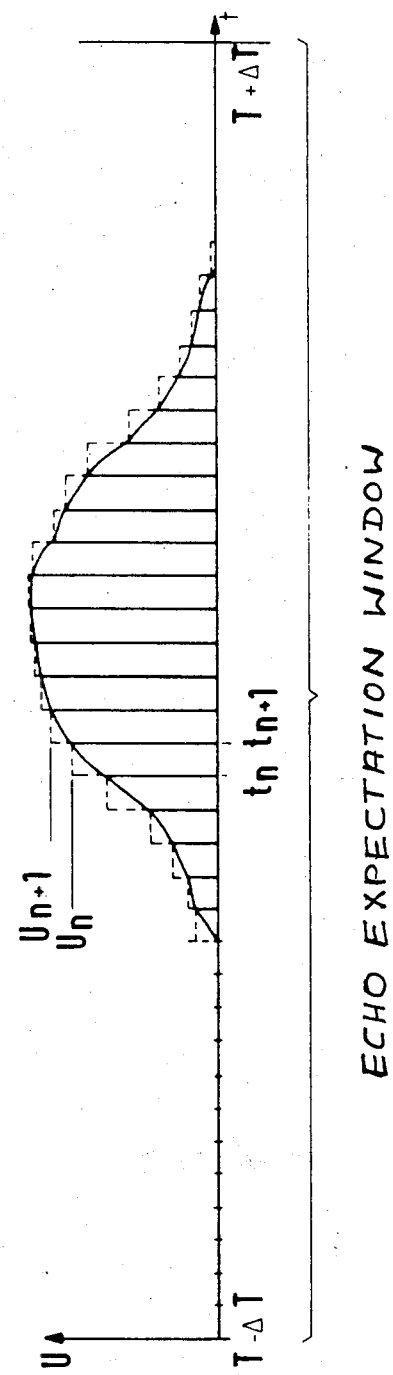

METHOD AND APPARATUS FOR ECHO TRANSIT TIME DETERMINATION

BACKGROUND OF THE INVENTION

The invention relates to a method and an apparatus for determining the transit time of echoes, triggered by exposing the bottom of the body of water to sound waves using sonic pulses, and more particularly to such a method and apparatus in which the echoes in received signals intercepted via at least one receiving lobe are detected.

In the case of depth sounding, such a method uses an echo or vertical sounder that has a receiving lobe pointing in the vertical direction or a receiving beam, or in the base of acoustical mapping of the surface profile of the bottom of the body of water the method uses what is known as a fan sounder, which spreads out a fan of receiving lobes or receiving beams in its sector, arranged in rows crosswise to the direction of travel of a watercraft and pivoted with respect to the vertical by a reception angle. In order to attain the smallest possible absolute measuring errors at great sounding depths, such a method must be in a position to determine the echo transit times with quite small error tolerances. A substantial contribution to this is made by the exact detection of the echo reflected from the bottom in the signals received directionally by the receiver.

In known methods of this kind, the echo detection is performed using the conventional methods of edge or threshold value discrimination. These methods are accurate only when the sending pulse meets the bottom exactly vertically. Then the echo is a reproduction of the sonic pulse itself, and the edge or threshold value descrimination leads to a very accurate temporal detection of the echo in the received signal. Contrarily, if a sonic pulse strikes the bottom at an angle of incidence that deviates from the vertical, then the received echo is no longer a reproduction of the sonic pulse that was sent, but is instead a roll-off function of the sending pulse over the bottom, received through a directional receiving lobe. As a result, discrete echoes, the echo length of which corresponds to the sending pulse length, are no longer received, but rather a distribution function via the receiving lobe is received. With such a distribution function, however, the methods of edge or threshold value discrimination are defective. Such roll-off functions, for one thing, always arise with a vertical receiving lobe if the bottom has an oblique course, that is, if it has an upward or downward slope with respect to a horizontal plane, and for another, arises in principle with receiving lobes pivoted counter to the vertical by an angle of reception, with the single exception being if the receiving direction is precisely normal to an inclined bottom.

Additionally, there is another phenomenon, which is dictated by the technical limits of side lobe suppression of the receiving antenna. Because sending pulses striking the bottom of the body of water or the sea bed normally are reflected back in the direction of sending or receiving, but sending pulses striking the bottom obliquely are dispersed or scattered, the amplitude of the vertical echo is considerably greater than that of the oblique echo. As a result, a fraction of the vertical echo is always contained in the received signal, and because of its great amplitude, even if it is suppressed, it is received via the side lobe. This vertical or side lobe echo can in many cases cause a response of the threshold value discriminator, and thus can result in extreme falsification of the echo detection. This happens for received signals both from directional receiving lobes that are inclined relative to the vertical and those from the vertical directional receiving lobe, if in the latter case the inclination of the bottom of the body of water is greater than the tangent of one-half the opening angle of the vertical directional receiving lobe. With a typical opening width of the vertical sounder of approximately 4°, this would be an inclination or drop of the bottom of the body of water of greater than 3.5%.

SUMMARY OF THE INVENTION

In a method and apparatus for determining the echo transit time of the above generic type, it is an object of the invention to substantially improve the accuracy and reliability of the echo detection.

In a method for determining the echo transit time of the generic type in which echoes are triggered by exposing the bottom of a body of water, e.g. seabed, to sonic pulses, and in which the echoes in received signals intercepted via at least one receiving lobe extending from a receiving location and having a lobe axis extending at a reception angle relative to the vertical, are detected, this object is attained in accordance with the invention by providing that a temporal echo expectation window is opened up on either side of an echo expectation time derived from the echo propagation of a known sounding depth, the temporal length of this window being dimensioned greater than a maximum echo length to be expected based on an assumed maximum slope of the bottom of the body of water and/or on the basis of the reception angle relative to the vertical of the receiving lobe axis, and that from the received signal defined by the echo expectation window, a center of gravity integral is calculated to determine a temporal center of gravity by which the echo transit time is defined.

The method includes the steps of intercepting a sonic signal including the echo, at the receiving location with the receiving lobe, opening a temporal echo expectation window on at least one side of an echo expectation time, the echo expectation time being a function of the echo propagation of a known sounding depth, determining a maximum temporal echo length as a function of at least one of an assumed maximum slope of the bottom of the body of water and the reception angle, and dimensioning the temporal length of the window to be greater than the maximum temporal echo length, receiving the signal intercepted with the receiving lobe in the echo expectation window, and calculating the temporal center of gravity integral of the received signal over the time period of the window to determine the echo transit time of the echo included in the received signal.

This method is suitably performed with an apparatus in accordance with the invention, including a receiving antenna which includes a plurality of equidistantly spaced electroacoustical transducers, a direction former, connected to the antenna, for forming the receiving lobe, an echo discriminator, connected to the direction former, for detection of the echo in the received signal received via the receiving lobe, and an edge discriminator having an input side connected to the antenna and an output side connected to the echo discriminator.

The method according to the invention is distinguished by extremely high accuracy in determining the echo transit time of the bottom echo contained in the received signals, regardless of the reception direction and of the inclination of the sea bed, in a way that, with the known method of edge or threshold value discrimination, is attainable only with purely vertical sounding and ideal conditions, that is, a horizontally extending sea bed. By forming the mathematical integral of the temporal center of gravity, the echo can be eliminated very accurately and the echo transit time can be ascertained exactly.

By the optimal adaptation of the echo expectation window to the depth of the body of water, taking into account the reception direction and/or a possible slope of the bottom of the body of water, a very good signal-to-noise ratio is attained, so that the echoes, some of which are considerably reduced in amplitude by scattering and which furthermore also represent a distribution function over the surface of the bottom encompassed by the receiving lobe, are sufficiently clearly distinguished from noise. For opening up the echo expectation window, an echo expectation time, that is, half the expected time duration for a sonic pulse to strike the bottom and return vertically to the receiving lobe, which is derived from a known sounding depth, is specified.

Since typically an initial sounding depth is not available, in accordance with a suitable embodiment of the method according to the invention in which a substantially nondirectional reception or a directional reception is performed with a receiving lobe having a substantially larger opening angle, and the echo transit time of the first echo in the signal course is used as the echo expectation time, in particular when, for ascertaining the echo expectation time (T), the received signal or the signal course of the substantially nondirectional reception is subjected to an edge or threshold value discrimination known per se, a nondirectional signal reception is also performed for deriving the echo expectation time after the transmission of the sonic pulse, and the echo transit time of the first echo in the received signal is determined. Since this first echo always originates in the sending pulse striking the bottom vertically, and hence is a reproduction of the sending pulse itself and has a relatively great amplitude, in this case the conventional method of edge or threshold value discrimination leads to an exact determination of the first echo transit time. With a purely vertical sounding using only a vertical directional receiving lobe, it is thus sufficient to increase the opening angle of the directional receiving lobe or, with a slight inclination of the bottom, to subject the directional received signal itself to an edge or threshold value discrimination, in order to determine the first echo transit time.

Suitably, in accordance with a further feature of the method according to the invention, the echo expectation time is ascertained in the preceding sounding (sending and reception) period. As a result, the signal reception performed in a directional manner via the receiving lobe can be limited to the time interval of the echo expectation window. Since for off-line processing of the reception signal for echo detection purposes this signal must be stored in memory, the memory capacity can accordingly be kept relatively small.

In a further feature of the method according to the invention wherein either the time boundaries of the chronologically first echo in the signal course of the substantially nondirectional reception are determined, and the received signal in the echo expectation window is suppressed to a predetermined extent prior to the formation of the center of gravity integral in these time boundaries, or the received signal in the echo expectation window is suppressed to a predetermined extent prior to the formation of the center of gravity integral between the time boundaries (T, T+L) defined by the echo expectation time (T) and the sum of the echo expectation time (T) and sonic pulse duration (L), the first echo transit time obtained by edge or threshold value discrimination is used to determine the echo limits of this first echo. Since this first echo originates in the reflection of the sonic pulse striking the oblique bottom vertically, the leading edge of this first echo is the first echo transit time, and the trailing edge is the sum of the first echo transit time and the sending pulse duration. If the received signal directionally received via the receiving lobe is now correspondingly suppressed in these time limits, then the vertical echo that is received via the side lobe with directional reception as described above, is eliminated from the received signal and so does not falsify the calculation of the center of gravity.

In purely vertical sounding with only a vertical receiving lobe, the window boundaries of the echo expectation window before and after the echo expectation time are defined in accordance with an advantageous feature of the method according to the invention. Preferably, the time interval of the front window boundary and rear window boundary with respect to the echo expectation time is selected to be the same.

The window boundaries of the echo expectation window can initially be estimated, for instance being approximately 3 times the maximum echo length to be expected or can be assumed to be approximately 10 to 20% of the presumed sounding depth. In the ensuing sounding, the length of the echo expectation window is then reduced to approximately the echo length that was in fact ascertained in the preceding sounding.

In accordance with a further feature of the method according to the invention, the length of the echo expectation window can be calculated with considerably better accuracy, as compared with estimation, by taking into account the physical opening angle of the antenna and a maximum assumed slope of the bottom of the body of water. In this calculation for defining the length of the echo expectation window, the time interval ($\Delta T$) of the window boundaries from the echo expectation time (T) is determined in accordance with $$\Delta T = T \left[ \frac{1}{\cos \theta} \left( 1 - \frac{1}{1 - \frac{1}{\Theta} ctg\theta} \right) - 1 \right] \quad (1)$$

where $2\sigma$ is the opening angle of the receiving lobe, $\theta$ is the downward or upward slope of an assumed maximum slope of the sea bed, and T is the echo expectation time. Since tests have shown that on the sea bed, with very few exceptions, relatively pronounced slopes having an inclination of greater than 25% are generally not present, the length of the echo expectation window can initially be defined generally in the manner of the above calculation, and then reduced accordingly upon ensuing soundings.

In the case of reception having one or more receiving lobes pivoted by a receiving angle with respect to the vertical, the window boundaries of the echo expectation window are calculated in accordance with a feature of the method according to the invention as follows: With a receiving lobe pivoted with respect to the vertical by a receiving angle ($\phi$), the earlier window boundary ($T_V$) is dimensioned in accordance with $$T_V = T\left[\frac{1}{\cos\phi}\left(1 - \frac{1}{1 + \frac{1}{\Theta}ctg\phi}\right) - 1\right] \quad (2)$$

and the later window boundary ($T_H$) is dimensioned in accordance with $$T_H = T\left[\frac{1}{\cos\phi}\left(1 - \frac{1}{1 - \frac{1}{\Theta}ctg\phi}\right) - 1\right] \quad (3)$$

where $\phi$ is the reception angle, measured with respect to the vertical, of the receiving lobe, $\theta$ is the upward slope of the maximum assumed slope, and T is the echo expectation time. Only in the case of receiving lobes having relatively small receiving angles (e.g., above 28°) are these boundaries located both before and after the echo expectation time. In all other cases, both window boundaries are temporally after the echo expectation time.

A suitable embodiment of the method according to the invention for the case of reception with pivoted receiving lobes provides that in the dimensioning of the back or temporally later window boundary ($T_H$), a maximum possible echo length is additionally taken into account, which is calculated from the reception angle ($\phi$) of the receiving lobe, the opening angle ($2\sigma$) of the receiving lobe, and the maximum assumed slope ($\pm\theta$) of the bottom of the body of water in the direction of the receiving lobe. By means of these provisions, the accuracy of the echo detection is improved further. In the definition of the later, temporally larger window boundary of the echo expectation window, the physical opening characteristic of the receiving lobe is additionally taken into account. Because the received echo represents a roll-off function of the sending pulse over the bottom surface cut out of the bottom by the receiving lobe, the later window boundary is dimensioned such that the sending pulse can illuminate the entire bottom surface defined by the opening characteristic of the antenna within the echo expectation window, and no echo segment is lost by premature closure of the echo expectation window.

The method according to the invention can be performed with advantageous embodiments of the apparatus of the invention. In one embodiment which is directed especially to vertical sounding for depth sounding, there is provided a sending and receiving antenna which includes a multiplicity of electroacoustical transducers, a direction former, connected to the antenna, preferably via a time-dependent amplification regulator, for forming the vertical receiving lobe, an echo discriminator, connected to the direction former, for echo detection in the received signal received via the vertical receiving lobe, and an edge discriminator, connected on the input side to the antenna, preferably with the interposition of the amplification regulator, and connected on the output side to the echo discriminator. The echo discriminator has a gate circuit with a gate opening time corresponding to the echo expectation window, a peak detector connected to the output side of the gate circuit, a memory connected to the output side of the peak detector, for writing in the maximum values emitted by the peak detector, and a calculating unit, connected to the memory output, for calculating the center of gravity integral from the maximum values stored in the memory. The apparatus according to another embodiment is directed to a fan sounder for mapping the surface of the bottom of the sea. In this embodiment, the receiving antenna includes a multiplicity of equidistantly disposed electroacoustical transducers, a direction former connected to the antenna, preferably via a time-dependent amplification regulator, for forming the at least one receiving lobe, preferably a multiplicity of receiving lobes spread out in fanlike fashion in one sector, an echo discriminator connected to the direction former for echo detection in the received signal received via at least one receiving lobe and preferably in each receiving lobe, and an edge discriminator for detection of the first echo contained in the signal received by the antenna, the edge discriminator being connected on the input side to the antenna, preferably with the interposition of the amplification regulator, and on the output side to the echo discriminator. The echo discriminator in association with each receiving lobe has a gate circuit with a gate opening time corresponding to the echo expectation window, a peak detector connected to the output of the gate circuit, a memory, connected to the ouptut of the peak detector, for storing the maximum values, and a calculating unit, connected to the memory output, for calculating the center of gravity integral from the maximum values stored in the memory.

BRIEF DESCRIPTION OF THE DRAWINGS

The invention will be explained in greater detail below in terms of preferred embodiments, referring to the drawings in which:

FIG. 5 is a block circuit diagram of a receiving apparatus of the fan echo sounder of FIG. 1;

FIG. 10 is a block circuit diagram of a receiving apparatus of the echo sounder of FIG. 8;

FIG. 11 is a block circuit diagram of an echo discriminator in FIG. 10; and

FIG. 12 is a diagram of a received signal defined by an echo expectation window.

DESCRIPTION OF THE PREFERRED EMBODIMENTS

Figure 1:
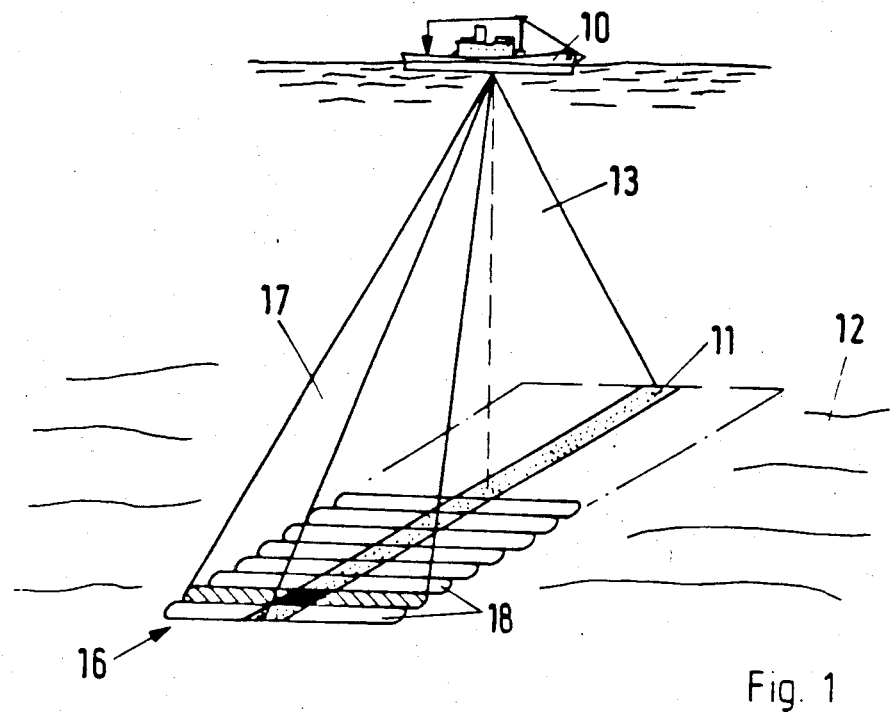
FIG. 1 is a schematic view, partially in perspective, of an illumination of the bottom of a body of water generated by a fan echo sounder of a mapping ship.

In a method for acoustical mapping of the profile of the surface of the sea bed, a fan echo sounder, known per se, having a sending and receiving apparatus is used, which is installed on the bottom of a watercraft, in this case a surface vessel 10. The disposition and embodiment of the sending and receiving apparatus of the echo sounder, which will not be described in detail here, may be of the kind described in U.S. Pat. No. 3,144,631.

With the sending apparatus, a transmitter target strip 11 located substantially vertically below the vessel 10, crosswise to its direction of travel, and located on the sea bed 12 is exposed to sonic pulses. By means of a suitable embodiment of the sending antenna, for instance as a linear array, and/or by electronic directional formation, the sending beam originating in the sending apparatus and represented at 13 in the drawing has an opening angle $2\sigma$ in the direction of travel of the vessel 10 is approximately 1° and crosswise to the direction of travel the angle subtended by the beam is approximately 60° to 90°.

The echoes produced in the transmitter target strip 11 by reflection upon the sea bed 12 are received in a directionally selective manner by the receiving apparatus. As schematically shown in FIG. 5, the receiving apparatus has for this purpose a receiving antenna 14 with a multiplicity of equidistantly disposed electroacoustical transducers 15. By means of corresponding electronic processing of the received signals of the individual transducers 15, the receiving apparatus spreads out a fan 16 of narrow receiving beams 17 arranged in rows, extending in and crosswise to the direction of travel, which defines receiver strips 18, such as those sketched in FIG. 1, on the sea bed 12. The opening angle $2\sigma$ of each receiving beam 17 is approximately 15° in the direction of travel (to avoid adverse effects upon reception due to limited pitch of the vessel 10) and approximately 1% crosswise thereto. The receiving apparatus is disposed relative to the sending apparatus such that the transmitter target strips 11 are covered by the fan 16 of receiver strips 18. In the fan 16, approximately 64 receiving beams 17 are present.

To obtain the profile of the surface of the sea bed 12, sonic pulse are transmitted in a known manner, and the transmitter target strips 11 on the sea bed 12 are acoustically illuminated. Via the receiving beams 17, received signals are directionally selectively detected. The echoes triggered by the sonic pulse at the sea bed 12 are contained in these received signals. These echoes are detected in the individual received signals; the echo transit time from the sea bed 12 to the receiving apparatus, which is equal to one-half the period of time from the transmission of the sending pulse to the reception of the echo, is determined; and from this, taking into account the instantaneous speed of sound in water, the depth points of the sea bed 12 are determined, which in association with the particular location of origin of the echo yields a measured profile of the sea bed 12 in the vicinity of the transmitter target strip 11. the multiplicity of individual measured profiles obtained in the forward or travel direction of the vessel 10, arranged in rows three-dimensionally, forms the surface profile of the sea bed 12 in the mapping range along a so-called mapping track.

The receiving apparatus of the fan echo sounder is shown in the form of a block circuit diagram in FIG. 5.

The electroacoustical transducers 15 are connected, via time-dependent amplification regulator 19, to a direction former 20, on the one hand, and on the other hand to an edge discriminator 21. In the amplification regulator 19, the distancedependent suppression of the amplitudes of the echoes is compensated for, so that the arriving echoes have an amplitude that is independent of the length of the propagation route in water. From the amplified output signals of the transducers 15, the direction former 20 forms a multiplicity of receiving lobes or beams 17, in this case 64 in number. Direction former 20 may be of the kind providing electronic processing as mentioned above. The edge discriminator 21, which may for instance be a simple threshold value switch, detects in the output signals of the transducers 15 the first echo, that is, the echo arriving chronologically first of all the echoes, and emits its echo transit time T. The echo transit time T is fed on the one hand to an echo discriminator 22 and on the other hand to a calculating unit 23. The echo discriminator 22 is connected to the direction former 20 and, as will be described in further detail below, detects the echoes contained in the received signals of the individual receiving beams 17 and determines the echo transit times of these echoes. To this end, it receives from the calculating unit 23 the time limits of an adaptive echo expectation window. The echo transit times are supplied by the echo discriminator 22 to the calculating unit 23, which from them ascertains the depth values and in association with the respective locations of origin of the echoes emits the measured profile in the vicinity of the transmitter target strip 11.

The amplification regulator 19 is known and for example described in U.S. Pat. No. 3,683,324 (see columne 3, line 59 to columne 4, line 38 and FIG. 1, blocks 28 and 38).

The direction former 19, also called beam former or beam forming circuits, generating a fan of beams, is also known and for example described in an older version in U.S. Pat. No. 3,144,631. A modern version of a beam former is described in U.S. Pat. No. 3,810,082. This beam former generates one beam which is pivotal in azimut. By means of parallel tapes it is possible to comteporaneously generate a plurality of beams.

The calculating unit 23 is a computer having different function:

i. Calculating for each preformed beam 17 in consideration on the individuell known beam or reception angle and of an assumed or estimated inclination $\theta$ the window boundaries $T_V$ and $T_H^*$ in according to the equations (4)–(7) described later. The calculating unit 23 calculates in the one hand the window length $T_H^* - T_V$ of the echo expectation window as a difference of the window boundaries and in the other hand the pulse boundaries $T+T_V$, $T+T_H^*$ of the opening pulse for the echo discriminator 22 as a sum of the echo expectation time T and the window boundaries $T_V$ and $T_H^*$. The window length and the pulse boundaries are supplied to the echo discriminator 22.

ii. Calculating for each time component $T_S$ in each preformed beam supplied to it by the echo discriminator 22 the depth points M (a, h) according to the equations (13)–(16) described later.

iii. General controlling.

For detection of the echoes in the individual received signals of the receiving beams 17, a temporal expectation window is opened up around (i.e., on either side of) an echo expectation time. As the echo expectation time, the echo transit time T of the first echo, furnished by the edge discriminator 21, is used. The temporal window boundaries of the echo expectation window for each receiving beam 17 are measured as a function of the receiving angle $\phi$ of the receiving lobe or receiving beam 17 and in accordance with a maximal assumed slope of the sea bed 12 in the direction of the receiving beam 17.

Figure 2:
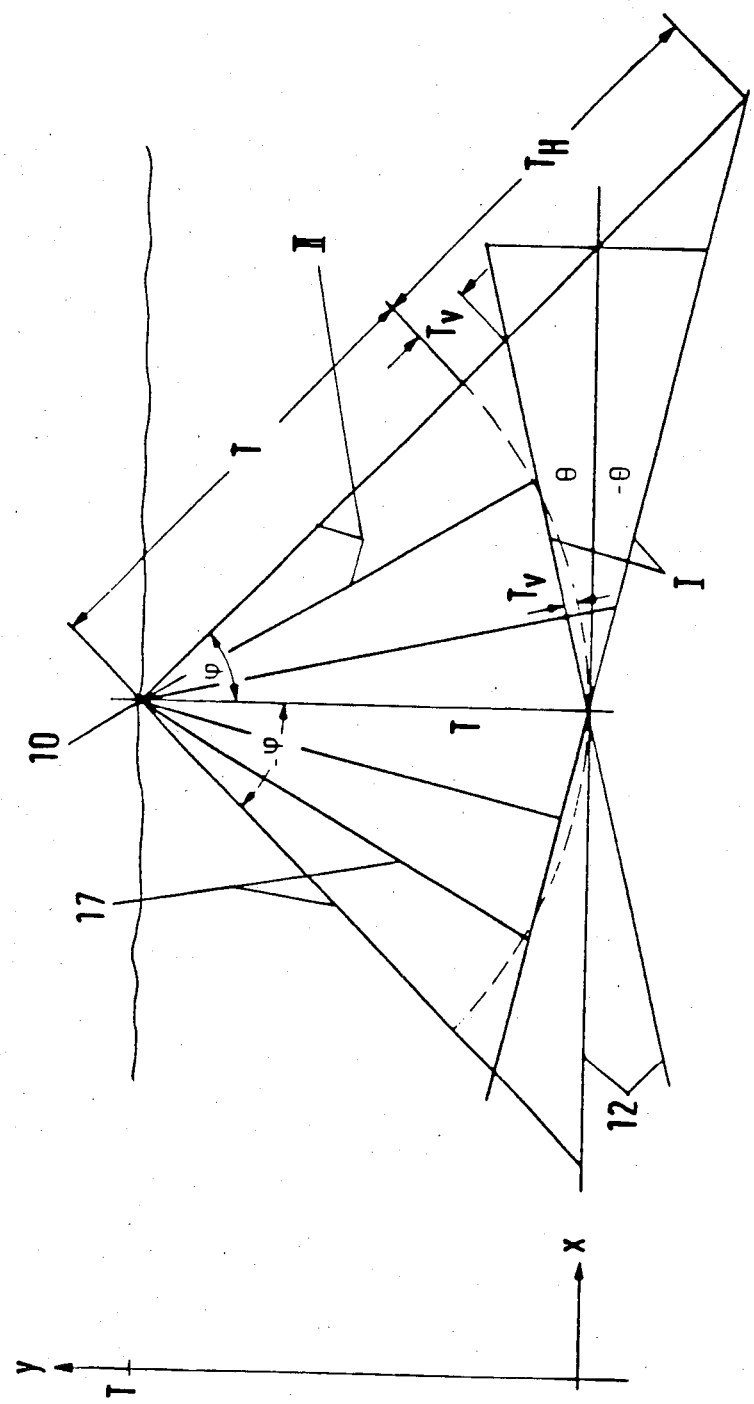
FIG. 2 is a schematic illustration of receiving directions of the fan echo sounder in FIG. 1, taking into account maximum assumed slopes of the bottom.
Figure 3:
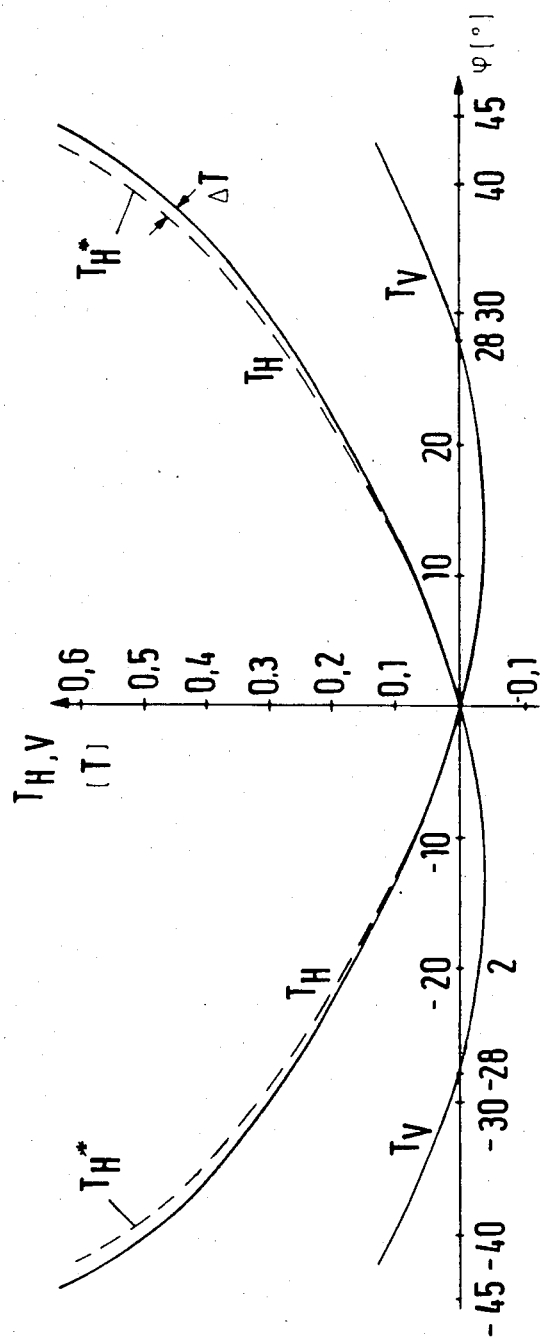
FIG. 3 is a diagram of the earlier and later window boundary of an echo expectation window, as a function of the angle $\phi$ of the reception directions.

FIG. 2 schematically shows a plurality of receiving beams 17, that are located at different receiving angles $\phi$. The slope of the sea bed 12 is represented with an upward inclination $+\theta$ or a dropping inclination $-\theta$. Based on these geometric relationships, the earlier time boundary $T_V$ of the echo expectation window relative to the echo expectation time T is calculated in accordance with $$T_V = T\left[\frac{1}{\cos\phi}\left(1 - \frac{1}{1 + \frac{1}{\Theta}ctg\phi}\right) - 1\right] \quad (4)$$

and the later window boundary $T_H$ of the echo expectation window is calculated in accordance with $$T_H = T\left[\frac{1}{\cos\phi}\left(1 - \frac{1}{1 - \frac{1}{\Theta}ctg\phi}\right) - 1\right] \quad (5)$$

where T is the echo expectation time, which here is the echo transit time T of the first echo, furnished by the edge discriminator 21. The window boundaries $T_V$ and $T_H$, standarized to T are shown in FIG. 3 as a function of the reception angle $\theta$ for a positive reception angle $\theta$ (in FIG. 2 on the right) and for a negative reception angle $\theta$ (in FIG. 2 on the left). The difference $T_H - T_V$ yields the temporal window length of the echo expectation window, which is opened up on either side of the echo expectation time T (in FIG. 3, the $\theta$ axis). In the diagram of the window boundaries $T_V$ and $T_H$ in FIG. 3 as a function of the reception angle $+\phi$ or $-\phi$, the slope of the sea bed 12 is assumed to have an inclination of $\theta = \pm 25\%$. In practice it is found that a greater rising slope or a greater dropping slope of the sea bed virtually never happens, with only rare exceptions.

Figure 4:
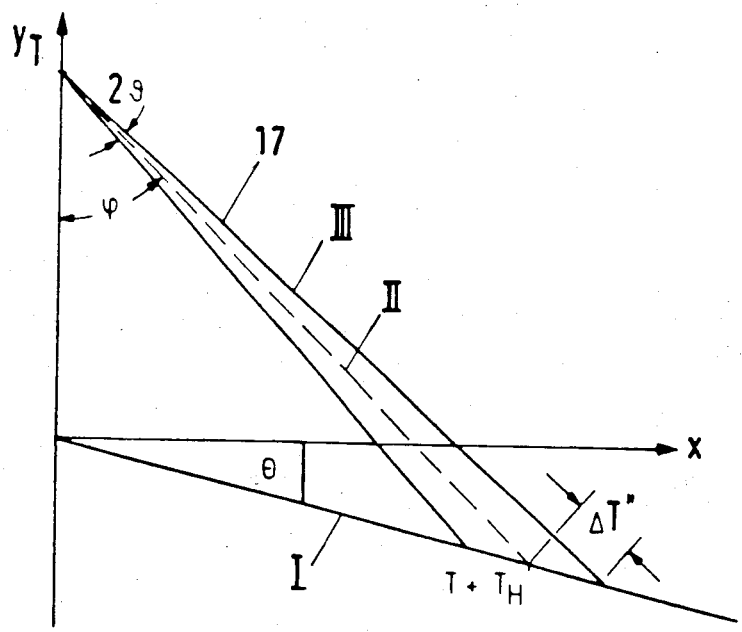
FIG. 4 is a schematic representation of a receiving lobe originating at the fan echo sounder at as receiving angle $\alpha$, having the opening angle of $2\sigma$.

In defining the later, chronologically larger window boundary $T_H$ of the echo expectation window, it must be taken into account that the receiving beams 17 are not infinitely narrow but rather have an opening angle crosswise to the direction of travel of approximately 1%. Such a receiving beam is shown schematically in FIG. 4, its reception angle indicated as $\phi$ and its opening angle as $2\sigma$. Since as initially described above the echo received via the receiving beam 17 is not a reproduction of the sonic pulse emitted but rather a roll-off function of the sonic pulse over the section of the sea bed 12 encompassed by the receiving beam 17, a maximum possible echo length should be taken into account in dimensioning the later window boundary $T_H$. This echo length is dependent on the geometry of the portion of the surface encompassed by the receiving beam 17 on the sea bed 12 and thus is dependent on the reception angle $\phi$ of the receiving beam 17, the opening angle $2\sigma$ of the receiving beam 17 and the drop $-\theta$ of the maximum assumed slope of the sea bed 12. Taking these dependencies into account, the later window boundary $T_H$ is shifted by a time increment $\Delta T''$ toward longer times, the time increment $\Delta T''$ being calculated in accordance with the following equation:

$$\Delta T'' = T\left[\frac{1}{\cos(\phi + \theta)}\left(1 - \frac{1}{1 - \frac{1}{\Theta}ctg(\phi + \theta)}\right) - \right. \quad (6)$$

$$\left. \frac{1}{\cos\phi}\left(1 - \frac{1}{1 - \frac{1}{\Theta}ctg\phi}\right)\right].$$

The corrected later time boundary $T^*_H$ is thus the result of the addition of the time increment $\Delta T''$ to the later window boundary $T_H$ in accordance with the following:

$$T^*_H = T_H + \Delta T'' \quad (7)$$

the corrected later window boundary $T^*_H$ is shown in FIG. 3, as a proportion of and relative to the echo expectation time T, once again as a function of the reception angles $\phi$ of the receiving beams 17. The actual window length is thus the result of the difference of the corrected later window boundary $T^*_H$ and the earlier window boundary $T_V$. These window boundaries are calculated by the calculating unit 23 for each reception angle $\phi$ of the 64 receiving beams 17 in accordance with the equations given above and supplied to the echo discriminator 22.

In the echo discriminator 22, the temporal center of gravity integral is formed for each receiving beam 17 by the receiving signal defined by the echo expectation window. In general, the temporal center of gravity integral is as follows:

$$T_S = \frac{1}{A}\int_{T_V}^{T^*_H} t\, dA \quad (8)$$

where dA is a time-signal amplitude surface-area element of the received signal and t is the time variable. The time component $T_S$ of the center of gravity discovered in this way yields the echo transit time for the echo detected. To increase the reliability of the detection of each echo, after the first center of gravity is located, the integration boundaries are reduced, beginning with the time boundaries $T_V$ and $T^*_H$ of the echo expectation window, in fact symmetrically with respect to the first center of gravity $T_S$ located. This procedure is performed several times for the same received signal, with a further reduction of the integration boundaries, so that the echo detection and the echo transit time determination is associated with only a very small error tolerance.

Figure 6:
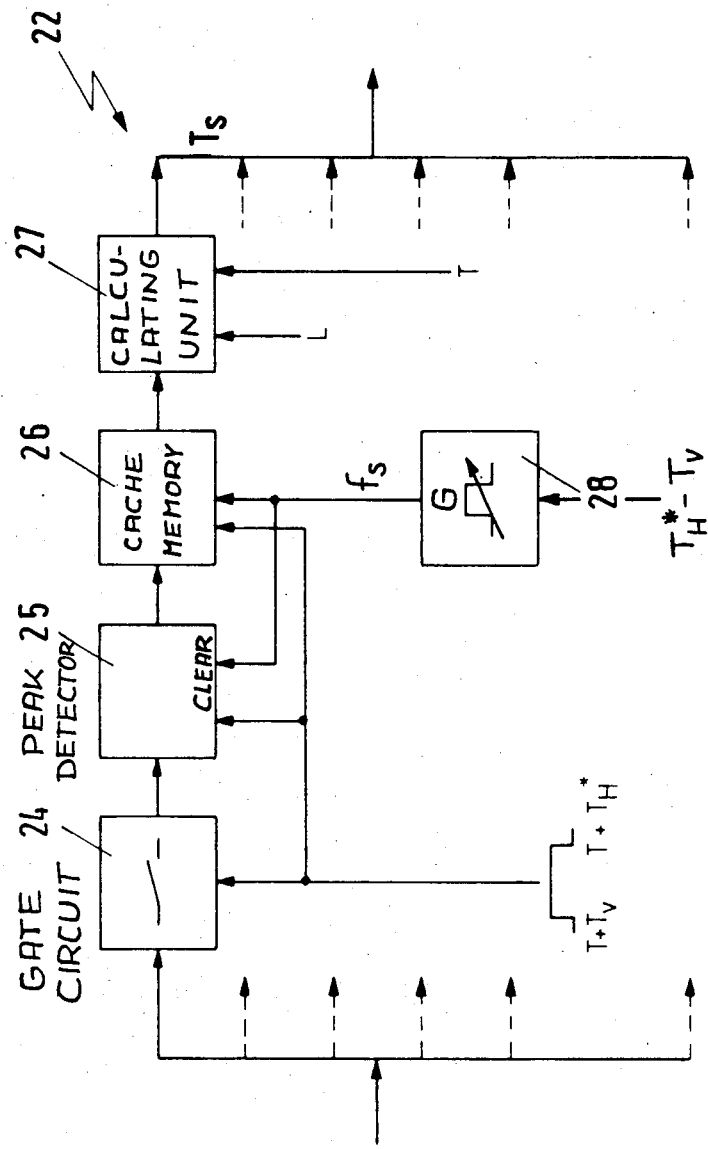
FIG. 6 is a block circuit diagram of an echo discriminator in FIG. 5.

The structure of the echo discriminator 22 is shown in detail in FIG. 6. For each directional channel furnished by the direction former 20 and corresponding to one receiving beam 17, the same components are provided in the same circuit layout, so that in FIG. 6 this is shown for only a single receiving beam or direction channel.

At the output of the directional channel of the direction former 20, a gate circuit 24 is provided, with a gate opening pulse applied to its control input. This gate opening pulse defines the echo expectation window in which the received signal, intercepted via the directional channel, is detected for echo detection purposes and stored in memory. Since the echo expectation window is opened up on either side of the echo expectation time T, the earlier pulse boundary is $T+T_V$ and the later pulse boundary is $T+T^*_H$. In this period, the gate circuit 24 is switched for connection, and the received signal is applied to a peak detector 25 (maximum finder) connected to the output side of the gate circuit 24. Since the limitation of the received signal to be evaluated is performed by the gate circuit on-line during the reception period, the window boundaries of the echo expectation window must already be defined at the instant the gate opens. For this reason, the echo transit time $T_{i-1}$ of the first echo, emitted by the edge discriminator 21 in the sending and receiving period immediately preceeding, is utilized for the echo expectation time T, if $i=1,2,3 \ldots n$ is the ordinal number of the sending and receiving periods. The echo transit time $T_i$ of the first echo detected in at least two subsequent sending and receiving periods will be continuously stored in the calculating unit 23, which calculates the pulse boundaries $T+T_V$ and $T+T_H^*$ always in using the earlier transit time $T_{i-1}$ of the first echo as the echo expectation time T.

Figure 7:
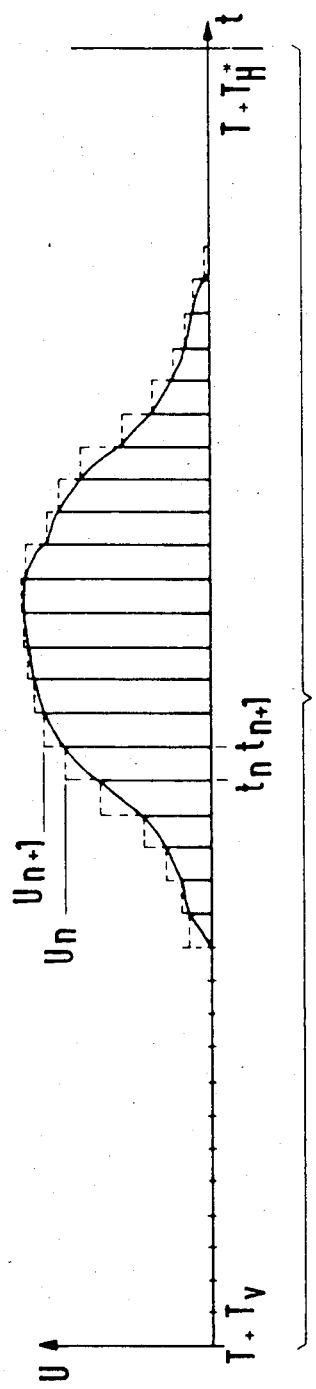
FIG. 7 is a diagram of a received signal defined by an echo expectation window.

In FIG. 7, a received signal limited by the echo expectation window, as it is applied to the peak detector 25, is shown by way of example. For the sake of simplicity, any possible interference or noise, which is always present, in the received signal has not been shown. Since the directional forming in the direction former 20 has already been generated by digital signal processing, the received signal, shown in analog form in FIG. 7, is present in the form of discrete values. A cache memory 26 is connected to the output of the peak detector 25, and a calculating unit 27 is connected to the cache memory 26. The sampling rate for the peak detector 25, which is equal to the recording frequency of the cache memory 26, is furnished by a clock generator 28. The sampling rate is adapted to the window length of the echo expectation window and is dimensioned in accordance with the ratio of the capacity of the cache memory 26 to the window length.

The clock generator 28 is provided with a control input connected to the calculating unit 23 to control its clock frequency (identical with the sampling rate or the sampling frequency $f_s$) as a function of the window length $T_H^* - T_V$ of the echo expectation window being calculated by the calculating unit 23. If the capacity of the cache memory 26 amounts to e. g. 1024 then the sampling frequency $f_s$ is made to $$f_s = \frac{1024}{T_H^* - T_V}.$$

The clock generator 28 may be realized by a rectangle waveform oszillator with constant frequency and a programmable frequency divider.

At the sampling rate, the peak detector 25 locates the maximum value from a given number of discrete values of the received signal, this number of discrete values being dictated by the sampling rate. Also at the sampling rate, this maximum value is written into the cache memory 26. With this writing, the peak detector 25 is cleared at the same time, so that it can subsequently select the maximum value from the next number of discrete values of the received signal. The cache memory 26 is filled with these sampling values during the gate opening time of the gate circuit 24. If the gate circuit 24 closes again, then the cache memory 26 is completely filled, for example with 1024 samples, which are distributed exactly to the window length of the echo expectation window.

By means of the calculating unit 27, the stored values contained in the cache memory 26 are now read out off-line, and the center of gravity integral is formed in accordance with the following equation:

$$T_S = (T + T_V) + \frac{\sum_{n=1}^{N} U_n(t) \cdot t_n}{\sum_{n=1}^{N} U_n(t)} \cdot C \qquad (9)$$

ps where $U_n$ is the amplitude (voltage) of the received signal and times $t_n$ are the sampling times defined by the sampling rate, relative to the initial window boundary $T+T_V$. Voltage amplitudes $U_n$ are the sampling values stored in the cache memory 26, while times $t_n$ correspond to the memory addresses of the cache memory 26. The constant C takes into account the fact that instead of a time-voltage surface area element $U_n(t)\cdot\Delta t$, only the voltage $U_n(t)$ is used in calculating the center of gravity. If $\Delta t$ (the time increment between successive voltage samples as defined by the sampling rate) is selected equal to 1, then $C=1$. The time component $T_S$ of the center of gravity is supplied to the calculating unit 23 which from it calculates the depth points, using a correction and gradation variable K supplied to it. The variable K takes into account the speed of sound, propagation anomalies and a calibration factor ascertained in calibration measurements.

The calculating unit 23 calculates the depth points M with the horizontal component a and the vertical component h using the time $T_S$ and the reception angle $\phi$ of the receiving beams 17, the speed $c_o$ of sound measured below the keel and the variable K ($K_a$, $K_h$) with the equations $$a = K_a \cdot T_S \cdot c_o \cdot \sin \phi \qquad (13)$$

$$h = K_h \cdot T_S \cdot c_o \cdot \cos \phi \qquad (14)$$

$$K_a = \frac{a'_x}{a} \qquad (15)$$

$$K_h = \frac{h'_x}{h} \qquad (16)$$

$a'_x$ and $h'_x$ will be calculated using an estimate velocigram in a manner described in U.S. Pat. No. 4,611,313 (see FIG. 4 and 5 and the specific description) at which $\alpha_{ox}$ is changed into $(90°-\phi)$ and $1_{mx}$ into $T_S\cdot c_o$.

As already referred to at the outset, a fraction of the so-called vertical echo, that is, an echo triggered by a sonic pulse striking the sea bed 12 vertically, is received via each receiving lobe as a result of the always-present side lobe of the antenna characteristic. If this vertical echo is within the echo expectation window, then this vertical echo is also included in the formation of the center of gravity integral and falsifies the echo detection. As FIG. 3 shows, this vertical echo will be contained in the echo expectation window of such received signals as are received at a reception angle $\phi$ between 0° and approximately 28°, given an allowable slope with an inclination of $\theta \pm 25\%$. In this range, the earlier boundary $T_V$ of the echo expectation window in FIG. 3 has a negative value, which means that the echo expectation window is opened at a time that is earlier than the echo expectation time T. Since the echo expectation time T, however, is equal to the echo transit time of the so-called first echo emitted by the edge discriminator 21, and this first echo is identical with the vertical echo, in the aforementioned reception angle range the echo detection is associated with a relatively large error. To eliminate this, the echo transit time T of the first echo, emitted by the edge discriminator 21, is fed to the calculating unit 27. Since at the same time the calculating unit 27 knows the duration or time length L of the sending pulse, in the formation of the center of gravity integral the scanning values contained in the cache memory 26 in the time range from T to T+L are reduced in their magnitude by a predetermined amount, which approximates a suppression of the received signal in this time range T through T+L. In this manner, the influence of the vertical echo received via the side lobes is eliminated, and the error tolerance in echo detection is reduced, even in this reception angle range, to the same extent as with greater reception angles $\phi$, or in the example of FIG. 3, greater than 28°.

Figure 8:
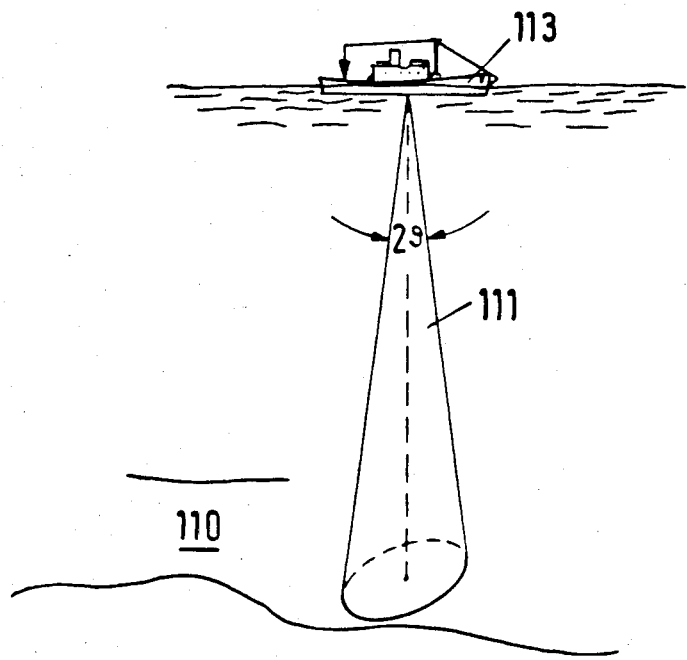
FIG. 8 is a schematic view, partially in perspective, of an illumination of the bottom of a body of water, generated by a vertical echo sounder.

In a method for depth sounding in water, an echo sounder known per se and having a sending and receiving apparatus is used, which transmits sonic pulses to a bottom 110 of a body of water and receives the echoes originating at the bottom 110 by reflection of the sonic pulses via a vertical receiving lobe (receiving beam) 111 having a physical opening angle $2\sigma$ as shown in FIG. 8. Typically, the same antenna 112 (see FIG. 10) is used for sending and receiving, so that the emitted sonic energy is also emitted along the same directional lobe 111. The antenna 112 of the echo sounder is disposed on the keel of a watercraft, in this case a surface vessel 113. The sending apparatus, known per se, need not be described in detail here. The receiving apparatus is shown in FIG. 10. The antenna 112 has a great number of electroacoustical transducers 114, which via a time-dependent amplification regulator (TVC) 115 are connected to a direction former 116, on the one hand, and an edge discriminator 117 on the other. In the amplification regulator 115, the distance-dependent suppression of the amplitudes of the echoes is compensated for, so that the arriving echoes have an amplitude that is independent of the length of the propagation route in the water. With a corresponding geometrical arrangement of the transducers 114, it may be sufficient, in order to attain the desired opening angle of the reception lobe 111, to embody the direction former 116 as a simple summing unit. To improve the opening characteristic, the output signals of the transducers 114 can also be time-delayed in various ways. The edge discriminator 117, which may for example be a simple threshold value switch, is supplied with either the summation signal of all the transducers or of one transducer group or with the output signal of a single transducer 114. In the input signal supplied to it, the edge discriminator 117 detects the first echo that arrives chronologically earliest and emits its echo transit time T. This echo transit time T is supplied on the one hand to an echo discriminator 118 and on the other to a calculating unit 119. The echo discriminator 118 is connected to the direction former 116 and, as will be explained in further detail below, detects the echoes contained in the received signals of the vertical receiving loop 111 or receiving beam 111 and determines the echo transit times of these echoes. To this end, the echo discriminator 118 receives from the calculating unit 119 the time boundaries of an adaptive echo expectation window. The echo transit times $T_S$ ascertained by the echo discriminator 118 are again fed to the calculating unit 123, which from them ascertains the depth values and emits the depth profile in association with the source location of the echo.

For detection of the echoes in the individual received signals of the receiving beam 111, a temporal expectation window is opened up around (i.e., on either side of) an echo expectation time T. As the echo expectation time, the echo transit time T of the first echo, furnished by the edge discriminator 117, is used. The temporal window boundaries of the echo expectation window are thus dimensioned as a function of a maximum assumed slope $\theta$ of the sea bed 110.

Figure 9:
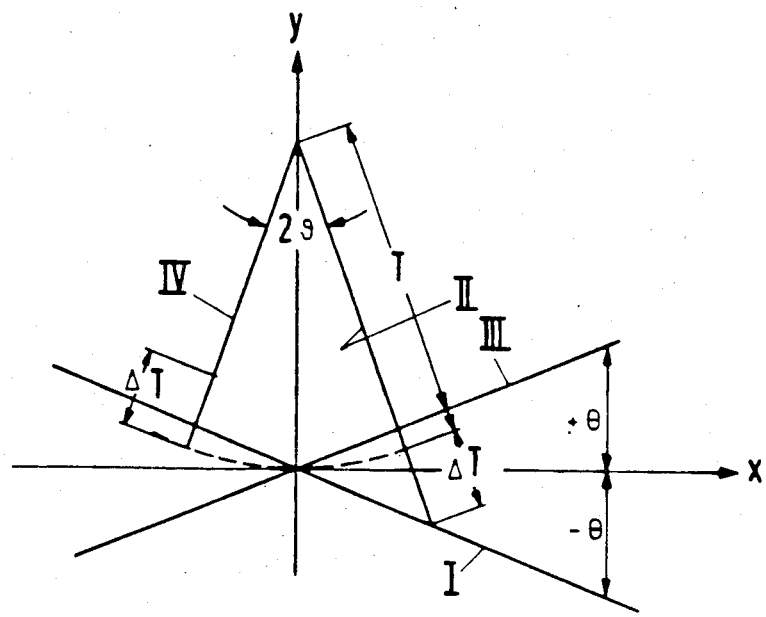
FIG. 9 is a schematic representation of the vertical receiving lobe of the echo sounder of FIG. 8, taking into account maximal assumed slopes of the bottom.

In FIG. 9, the receiving beam 111 is shown schematically. The slope of the sea bed 110 is shown with an upward slope $+\theta$ or a downward slope $-\theta$. Based on these geometrical relationships, the time interval $\Delta T$ of the window boundaries before and after the echo expectation time are defined in accordance with the following equation:

$$\Delta T = T\left\{ \frac{1}{\cos \theta}\left(1 - \frac{1}{1 - \frac{1}{\Theta} ctg\theta}\right) - 1 \right\} \quad (10)$$

where T is the echo expectation time, which here is selected to be equal to the echo transit time T of the first echo as furnished by the edge discriminator 117, and $\theta$ is one-half the opening angle of the receiving beam 111. For calculating the window boundaries, the maximum slope $\theta$ of the sea bed 110 is assumed to be 25% since, as indicated above, it has been found in practice that, with only a few exceptions, a greater upward or downward inclination of the sea bed never occurs.

In the echo discriminator 118, the center of gravity integral is formed from the received signal defined by the echo expectation window. In general, the center of gravity interval is as follows:

$$T_S = \frac{1}{A} \int_{-\Delta T}^{\Delta T} t dA \quad (11)$$

where dA is a surface-area element of the received signal and t is the time variable. The time component $T_S$ of the center of gravity discovered in this way yields the echo transit time for the echo detected. To increase the reliability of the detection, after the first center of gravity is located the integration boundaries are reduced, beginning with the time boundaries $T-\Delta T$ and $T+\Delta T$ of the echo expectation window, in fact symmetrically with respect to the first center of gravity $T_S$ located. This procedure is performed several times, with a further reduction of the integration boundaries, so that the echo detection and the echo transit time determination is associated with only a very small error tolerance.

The structure of the echo discriminator 118 is shown in detail in FIG. 11. At the output of the directional channel of the direction former 116, a gate circuit 120 is provided, with a gate opening pulse applied to its control input. This gate opening pulse defines the echo expectation window in which the received signal, intercepted via the receiving beam 111, is detected for echo detection purposes and stored in memory. Since the echo expectation window is opened up on either side of the echo expectation time T, the earlier pulse boundary is $T-\Delta T$ and the later pulse boundary is $T+\Delta T$. In this period, the gate circuit 120 is switched for connection, and the received signal is applied at a peak detector 121 connected to the output side of the gate circuit 120. Since the limitation of the received signal to be evaluated is performed on-line during the reception period, the window boundaries of the echo expectation window must already be defined at the instant the gate opens. For this reason, the echo transit time $T_{i-1}$ of the first echo, emitted by the edge discriminator 117 in the sending and receiving period immediately preceding, is utilized for the echo expectation time T, if i=1,2,3, ... n is the ordinal number of the sending and receiving periods. The echo transit time $T_i$ of the first echo detected in at least two subsequent sending and receiving periods will be continuously stored in the calculating unit 119, which calculates the time interval $\Delta T$ of the window boundaries before and after the echo expectation time T always in using the earlier transit time $T_{i-1}$ of the first echo as the echo expectation time T.

In FIG. 12, a received signal defined by the echo expectation signal, as it is applied to the peak detector 121, is shown by way of example. For the sake of simplicity, any possible interference or noise, which is always present, in the received signal has not been shown. In general, the received signal shown in analog form in FIG. 11 is present digitally in the form of discrete values. The sampling rate for the peak detector 121, which is equal to the recording frequency of the cache memory 122, is furnished by a clock generator 124. The sampling rate is adapted to the temporal window length of the temporal echo expectation window and is dimensioned in accordance with the ratio of the capacity of the cache memory 122 to the window length.

The peak detector 121 locates the maximum value from a number of discrete values of the received signal, the number of discrete valuesbeing dictated by the sampling rate. With the sampling rate, this maximum value is written into the cache memory 122. With this writing, the peak detector 121 is cleared at the same time, so that is subsequently eliminates the maximum value from the next number of discrete values of the received signal. The cache memory 122 is filled with these sampling values during the gate opening time of the gate circuit 120. If the gate circuit 120 closes again, then the cache memory 122 is completely filled, for example with 1024 samples, which are distributed exactly to the window length of the echo expectation window.

By means of the calculating unit 123, the stored values contained in the cache memory 122 are now read out off-line, and the temporal center of gravity integral is formed in accordance with the following equation:

$$T_S = (T - \Delta T) + \frac{\sum_{n=1}^{N} U_n(t) \cdot t_n}{\sum_{n=1}^{N} U_n(t)} \cdot C \quad (12)$$

where U is the amplitude (voltage) of the received signal and $t_n$ are the sampling times defined by the sampling rate relative to the initial window boundary $T-\Delta T$. Voltage amplitudes $U_n$ are the sampling values stored in the cache memory 122, while times $t_n$ correspond to the memory addresses of the cache memory 122. The constant C takes into account the fact that instead of a voltage-time surface area element $U_n(t)\cdot\Delta t$ (the time increment between successive voltage samples as defined by the sampling rate), only the voltage $U_n(t)$ is used in calculating the center of gravity. If $\Delta t$ is selected equal to 1, then C=1. The time components $T_S$ o the center of gravity is supplied to the calculating unit 119 which from the time component $T_S$ calculates the depth points, using a correction and gradation variable K supplied to it. The variable K takes into account the speed of sound, propagation anomalies and a calibration factor ascertained in calibration measurements.

The calculating unit 119 calculates the depth point h using the time $T_S$, the speed $c_o$ of sound measured below the keel and the variable K with the equations $$h = K \cdot c_o \cdot T_S \quad (17)$$

$$K = \frac{c_m}{c_o}. \quad (18)$$

The average speed of sound $c_m$ is determined in a manner described in U.S. Pat. No. 4,611,313 (see here the equation (4) and (5) and the specific description).

Instead of calculating the window boundaries of the echo expectation window according to equation 7, the length of the echo expectation window can also be initially estimated. For example, the length of the echo expectation window can be assumed to be equal t 3 times the maximum echo length to be expected, or for example may be assumed to be from 10–20% of the presumed water depth. The earlier and later window boundaries are provided at equal time intervals relative to the echo expectation time T (in other words, are at equal time increments to either side of point T). Within these window boundaries, the received signal is detected and stored in memory. In the above-described formation of the center of gravity integral, the echo length is additionally measured. In the subsequent sounding period, the length of the echo expectation window is then reduced approximately to the echo length detected.

Via side loops of the receiving beam 11 which are always present, so-called vertical echoes can be received. Vertical echoes are echoes that are triggered by a sonic pulse striking the sea bed 110 vertically. These vertical echoes have a maximum amplitude. These vertical echoes are identical to the aforementioned first echoes, because the distance between the receiver and the sea bed 110 is at a minimum. If this vertical echo is located within the echo expectation window, then this vertical echo is incorporated in the formation of the center of gravity integral and falsifies the echo detection. To eliminate this vertical echo, the echo transit time T of the first echo, emitted by the edge discriminator 117, is supplied to the calculating unit 123 of the echo discriminator 118. At the same time, this calculating unit is supplied with the duration or time length L of the sending pulse. The calculating unit 123 now reduces the magnitude of the sampling values contained in the cache memory 122 in the time range from T to T+L by a predetermined amount, which approximates a suppression of the received signal in this time range T to T+L. In this manner, the influence of the vertical echoes received via the side loops is eliminated prior to the center of gravity formation.

The amplification regulator 115 is identical to the amplification regulator 15.

The direction former 116 generates only one vertical beam and is realized in the simplest manner by a simple adding network. The direction former 116 may also be embodied as the beamforming network described in the U.S. Pat. No. 3,810,082.

The calculating unit 119 is embodied as a computer has different functions:

i. Calculating the time interval $\Delta T$ of the window boundaries before and after the echo expectation time $T_m$ according to the equation (10). The calculating unit 119 calculates the pulse boundaries $T-\Delta T$ and $T+\Delta T$ of the opening pulse for the echo discriminator 118 by subtraction respectively adding the time interval $\Delta T$ from respectively to the echo expectation time T. The window length $2\Delta T$ and the pulse boundaries $T-\Delta T$ and $T+\Delta T$ are supplied to the echo discriminator 118.

ii. Calculating for each time component $T_S$ supplied to it by the echo discriminator 118 the depth point h according to the equations (17) and (18).

iii. General controlling.

The present disclosure relates to the subject matter disclosed in West German patent applications Ser. Nos. P 36 19 253.8 and P 37 05 286.1, filed June 7th, 1986 and Feb. 19th, 1987, respectively, the entire specifications of which are incorporated herein by reference.

It will be understood that the above description of the present invention is susceptible to various modifications, changes and adaptations, and the same are intended to be comprehended within the meaning and range of equivalents of the appended claims.

What is claimed is:

1. A method for determining a transit time of an echo to a receiving location in a receiving lobe extending from the receiving location and having a lobe axis extending at a reception angle relative to a vertical direction in each of a succession of sounding periods, the echo being triggered by exposing a bottom of a body of water to a sonic pulse in each sounding period, the method comprising the steps of, in each sounding period:

intercepting a sonic signal including the echo, at the receiving location with the receiving lobe;

opening a temporal echo expectation window having a temporal length, on at least one side of an echo expectation time, the echo expectation time being a function of the echo propagation of a known sounding depth;

determining a maximum temporal echo length as a function of at least one of an assumed maximum slope of the bottom of the body of water and the reception angle, and dimensioning the temporal length of the window to be greater than the maximum temporal echo length;

receiving the signal intercepted with the receiving lobe in the echo expectation window; and calculating a temporal center of gravity integral of the received signal over the time period of the window to determine the echo transit time of the echo included in the received signal.

2. An apparatus as in claim 1, including a receiving antenna which includes a plurality of equidistantly distantly spaced electroacoustical transducers;

a direction former, connected to the antenna, for forming the receiving lobe;

an echo discriminator, connected to the direction former, for detection of the echo in the signal received via the receiving lobe; and an edge discriminator having means for detecting the first echo in the sonic signal and having an input side connected to the antenna and an output side connected to the echo discriminator, wherein the direction former comprises means for forming a plurality of successively angularly spaced receiving lobes spread out in a fanlike fashion in one sector, said echo discriminator comprising means for detecting echoes in respective sonic signals received by said antenna in respective ones of said receiving lobes and wherein the echo discriminator includes a plurality of discriminator circuits, one for each receiving lobe, each discriminator circuit including:

a gate circuit having an output side and means for opening the gate circuit during a time corresponding to the echo expectation window so as to permit the received signal to pass therethrough, a peak detector having an input side connected to the output side of the gate circuit, and an output side for emitting maximum values of the received signal passed through the gate circuit, a memory having an input side connected to the output side of the peak detector for writing in maximum values emitted by the peak detector, and a memory output, and a first calculating unit connected to the memory output, for calculating the center of gravity integral from the maximum values stored in the memory;

said apparatus further comprising a second calculating unit having means for defining the respective gate open time for the gate circuit of each discriminator circuit, the second calculating unit being connected to the edge discriminator and to each gate circuit.

3. A method as in claim 1, further comprising the steps of performing a direction reception of a sonic signal with a receiving lobe having a large opening angle, detecting the first echo in the sonic signal, determining the transit time of the first echo, and performing said step of opening using the transit time of the first echo as the echo expectation time.

4. A method as in claim 1, wherein, except for a first sounding period, the echo expectation time used in each sounding period is determined in an immediately preceding sounding period.

5. A method as in claim 1, wherein said step of detecting the first echo comprises the step of detecting the first echo by one of edge discrimination and threshold value discrimination.

6. A method as in claim 1, further comprising the steps of performing one of a substantially nondirectional reception and a wide angle directional reception, of a sonic signal, detecting the first echo in the sonic signal, determining the transit time of the first echo, and performing said step of opening using the transit time of the first echo as the echo expectation time.

7. A method as in claim 6, further comprising the steps of determining the time boundaries of the first echo and suppressing to a predetermined degree within the time boundaries of the first echo the received signal received in the echo expectation window to the extent of overlap of the echo expectation window and the time boundaries of the first echo, to obtain a suppressed received signal, said step of calculating consisting of the step of calculating the temporal center of gravity integral of the suppressed received signal to determine the echo transit time of the echo included in the received signal.

8. A method as in claim 6, further comprising the steps of suppressing to a predetermined degree during a time period bounded by the echo expectation time and the sum of the echo expectation time and the duration of the sonic pulse, the received signal received in the echo expectation window, to the extent of overlap of the echo expectation window and the time boundaries of the first echo, to obtain a suppressed received signal, said step of calculating consisting of the step of calculating the temporal center of gravity integral of the suppressed received signal to determine the echo transit time of the echo included in the received signal.

9. A method as in claim 6, wherein, except for a first sounding period, the echo expectation time used in each sounding period is determined in a preceding sounding period, the method further comprising the steps of determining the time boundaries of the first echo in a given sounding period and suppressing to a predetermined degree within the time boundaries of the first echo in the given sounding period the received signal received in the echo expectation window of a sounding period subsequent to the given sounding period to the extent of overlap of the echo expectation window and the time boundaries of the first echo, to obtain a suppressed received signal, said step of calculating consisting of the step of calculating the temporal center of gravity integral of the suppressed received signal to determine the echo transit time of the echo included in the received signal.

10. A method as in claim 6, wherein said step of detecting the first echo comprises the step of detecting the first echo by one of edge discrimination and threshold value discrimination and, except for a first sounding period, the echo expectation time used in each sounding period is determined in a preceding sounding period, the method further comprising the steps of suppressing to a predetermined degree during a time period bounded by the echo expectation time and the sum of the echo expectation time and the duration of the sonic pulse, the received signal received in the echo expectation window, to the extent of overlap of the echo expectation window and the time boundaries of the first echo, to obtain a suppressed received signal, said step of calculating consisting of the step of calculating the temporal center of gravity integral of the suppressed received signal to determine the echo transit time of the echo included in the received signal.

11. A method as in claim 1, further comprising the step of repeating at least once said step of calculating by calculating the temporal center of gravity integral of the received signal over a time period centered at the temporal center of gravity calculated in a previous step of calculating, the time period being reduced relative to the time period of the previous step of calculating.

12. A method as in claim 1, wherein the receiving lobe is directed vertically, the echo expectation window having temporal boundaries on both temporal sides of the echo expectation time.

13. A method as in claim 12, wherein, except for a first sounding period, the echo expectation time used in each sounding period is determined in a preceding sounding period, the echo expectation time used in the first sounding period being estimated at some length greater than an expected maximum echo length.

14. A method as in claim 12, wherein the temporal boundaries of the echo expectation window are temporally spaced by respective time intervals of a same time duration $\Delta T$ from the echo expectation time.

15. A method as in claim 14, further comprising the step of determing the time duration T according to the following equation:

$$\Delta T = T \left\{ \frac{1}{\cos\theta} \left( 1 - \frac{1}{1 - \frac{1}{\Theta} ctg\theta} \right) - 1 \right\}$$

where $2\sigma$ is the opening angle of the receiving lobe, $\theta$ is the slope of an assumed maximum slope of the bottom of the water and T is the echo expectation time.

16. A method as in claim 1, further comprising the step of calculating the depth of the water at the intersection of the receiving lobe and the bottom of the water using the speed of sound in water and the calculated temporal center of gravity.

17. A method as in claim 1, wherein the earlier boundary $T_V$ of the temporal echo expectation window relative to the echo expectation time is calculated as follows:

$$T_V = T \left[ \frac{1}{\cos\phi} \left( 1 - \frac{1}{1 + \frac{1}{\Theta} ctg\phi} \right) - 1 \right]$$

and the latter boundary $T_H$ of the temporal echo expectation window relative to the echo expectation time is calculated as follows:

$$T_H = T \left[ \frac{1}{\cos\phi} \left( 1 - \frac{1}{1 - \frac{1}{\Theta} ctg\phi} \right) - 1 \right]$$

wherein $\phi$ is the reception angle of the receiving lobe, $\theta$ is the slope of an assumed maximum slope of the bottom of the water and T is the echo expectation time.

18. A method as in claim 1, wherein the earlier boundary $T_V$ of the temporal echo expectation window relative to the echo expectation time is calculated as follows:

$$T_V = T \left[ \frac{1}{\cos\phi} \left( 1 - \frac{1}{1 + \frac{1}{\Theta} ctg\phi} \right) - 1 \right]$$

wherein $\phi$ is the reception angle of the receiving lobe, $\theta$ is the slope of an assumed maximum slope of the bottom of the water and T is the echo expectation time; and
the later boundary $T_H$ of the temporal echo expectation window relative to the echo expectation time is calculated, taking into account a maximum possible echo length to be received in the echo expectation window, as a function of $\phi$, $\theta$, T and the opening angle $2\sigma$ of the receiving lobe.

19. A method as in claim 1, wherein the earlier boundary $T_V$ of the temporal echo expectation window relative to the echo expectation time is calculated as follows:

$$T_V = T\left[\frac{1}{\cos\phi}\left(1 - \frac{1}{1 + \frac{1}{\theta}ctg\phi}\right) - 1\right]$$

wherein $\phi$ is the reception angle of the receiving lobe, $\theta$ is the slope of an assumed maximum slope of the bottom of the water and T is the echo expectation time; and the later boundary $T^*_H$ of the temporal echo expectation window relative to the echo expectation time is the sum of a first time increment $T_H$ and a second time increment $T''$, where $T_H$ is calculated as follows:

$$T_H = T\left[\frac{1}{\cos\phi}\left(1 - \frac{1}{1 - \frac{1}{\theta}ctg\phi}\right) - 1\right]$$

and $T''$ is calculated taking into account a maximum possible echo length to be received in the echo expectation window, as a function of $\phi$, $\theta$, T and the opening angle $2\sigma$ of the receiving lobe.

20. A method as in claim 19, wherein $T''$ is calculated as follows:

$$\Delta T'' = T\left[\frac{1}{\cos(\phi + \theta)}\left(1 - \frac{1}{1 - \frac{1}{\theta}ctg(\phi + \theta)}\right) - \frac{1}{\cos\phi}\left(1 - \frac{1}{1 - \frac{1}{\theta}ctg\phi}\right)\right].$$

21. An apparatus for performing the method of claim 1, including:
a receiving antenna which includes a plurality of equidistantly spaced electroacoustical transducers;
a direction former, connected to the antenna, for forming the receiving lobe;
an echo discriminator, connected to the direction former, for detection of the echo in the signal received via the receiving lobe; and
an edge discriminator having means for detecting the first echo in the sonic signal and having an input side connected to the antenna and an output side connected to the echo discriminator wherein the echo discriminator includes:
a gate circuit having an output side and means for opening the gate circuit during a time corresponding to the echo expectation window so as to permit the received signal to pass therethrough,
a peak detector having an input side connected to the output side of the gate circuit, and an output side for emitting maximum values of the received signal passed through the gate circuit,
a memory having an input side connected to the output side of the peak detector for writing in maximum values emitted by the peak detector, and a memory output, and
a first calculating unit connected to the memory output, for calculating the center of gravity integral from the maximum values stored in the memory.

22. An apparatus as in claim 21, wherein said memory has a write-in frequency inversely proportional to the window length of the echo expectation window.

23. A method as in claim 1, further comprising the step of determining the echo expectation time, said step of determining the echo expectation time including the step of subjecting the intercepted signal to one of edge discrimination and threshold value discrimination.

24. An apparatus for performing the method of claim 1, wherein the receiving lobe is a vertical receiving lobe, the apparatus including:
a sending and receiving antenna which includes a plurality of electroacoustical transducers;
a direction former, connected to the antenna, for forming the vertical receiving lobe;
an echo discriminator, connected to the direction former, for detection of the echo in the received signal received via the receiving lobe; and
an edge discriminator having an input side connected to the antenna and an output side connected to the echo discriminator wherein the echo discriminator includes:
a gate circuit having an output side and means for opening the gate circuit during a gate open time corresponding to the echo expectation window so as to permit the received signal to pass therethrough,
a peak detector having an input side connected to the output side of the gate circuit, and an output side for emitting maximum values of the received signal passed through the gate circuit,
a memory having an input side connected to the output side of the peak detector for writing in maximum values emitted by the peak detector, and a memory output, and
a first calculating unit connected to the memory output, for calculating the center of gravity integral from the maximum values stored in the memory.

25. An apparatus as in claim 24, further comprising a second calculating unit having means for defining the gate open time, connected to the edge discriminator and to the gate circuit.

26. An apparatus as in claim 24, wherein said memory has a write-in frequency inversely proportional to the window length of the echo expectation window.

27. A method for acoustically mapping he surface profile of a bottom of a body of water by determining transit times of respective echoes to a receiving location in respective receiving lobes in a fan of receiving lobes each extending from the receiving location and having respective lobe axes extending at various respective reception angles relative to a vertical direction in each of a succession of sounding periods, the echo being triggered by exposing the bottom of a body of water to a sonic pulse in each sounding period and for each receiving lobe:
intercepting a sonic signal including the echo, at the receiving location with the receiving lobe;
opening a temporal echo expectation window having a temporal length, on at least one side of an echo expectation time, the echo expectation time being a function of the echo propagation of a known sounding depth;
determining a maximum temporal echo length as a function of at least one of an assumed maximum slope of the bottom of the body of water and the reception angle, and dimensioning the temporal length of the window to be greater than the maximum temporal echo length;
receiving the signal intercepted with the receiving lobe in the echo expectation window;
calculating a temporal center of gravity integral of the receiving signal over the time period of the window to determine the echo transit time of the echo included in the received signal; and
calculating a depth of the water at each of intersections of each of the respective receiving lobes and the bottom of the water using the speed of sound in the water and the calculated temporal center of gravity for each of the respective receiving lobes.

28. A method as in claim 27, wherein for each receiving lobe the earlier boundary $T_V$ of the temporal echo expectation window relative to the echo expectation time is calculated as follows:

$$T_V = T\left[\frac{1}{\cos\phi}\left(1 - \frac{1}{1 + \frac{1}{\theta}ctg\phi}\right) - 1\right]$$

wherein $\phi$ is the reception angle of the receiving lobe, $\theta$ is the slope of an assumed maximum slope of the bottom of the water and T is the echo expectation time, and
the later boundary $T^*_H$ of the temporal echo expectation window relative to the echo expectation time is the sum of a first time increment $T_H$ and a second time increment $T''$, where $T_H$ is calculated as follows:

$$T_H = T\left[\frac{1}{\cos\phi}\left(1 - \frac{1}{1 - \frac{1}{\theta}ctg\phi}\right) - 1\right]$$

and T'' is calculated taking into account a maximum possible echo length to be received in the echo expectation window, as follows:

$$\Delta T'' = T\left[\frac{1}{\cos(\phi + \theta)}\left(1 - \frac{1}{1 - \frac{1}{\theta}ctg(\phi + \theta)}\right) - \frac{1}{\cos\phi}\left(1 - \frac{1}{1 - \frac{1}{\theta}ctg\phi}\right)\right].$$

29. A method as in claim 27, wherein for each receiving lobe the earlier boundary $T_V$ of the temporal echo expectation window relative to the echo expectation time is calculated as follows:

$$T_V = T\left[\frac{1}{\cos\phi}\left(1 - \frac{1}{1 + \frac{1}{\theta}ctg\phi}\right) - 1\right]$$

and the latter boundary of the temporal echo expectation window relative to the echo expectation time is calculated as follows:

$$T_H = T\left[\frac{1}{\cos\phi}\left(1 - \frac{1}{1 - \frac{1}{\theta}ctg\phi}\right) - 1\right]$$

wherein $\phi$ is the reception angle of the receiving lobe, $\theta$ is the slope of an assumed maximum slope of the bottom of the water and T is the echo expectation time.

30. An apparatus for performing the method of claim 28, including:
a receiving antenna which includes a plurality of equidistantly spaced electroacoustical transducers;
a direction former, connected to the antenna, for forming the receiving lobes;
an echo discriminator, connected to the direction former, for detection of the echoes in the sonic signals received by the antenna via the respective receiving lobes; and
an edge discriminator having means for detecting the first echo in each sounding period, and having an input side connected to the antenna and an output side connected to the echo discriminator, wherein the direction former comprises means for forming a plurality of successively angularly spaced receiving lobes spread out in a fanlike fashion in one sector, said echo discriminator comprising means for detecting echoes in respective sonic signals received by said antenna in respective ones of said receiving lobes and wherein the echo discriminator includes a plurality of discriminator circuits, one for each receiving lobe, each discriminator circuit including:
a gate circuit having an output side and means for opening the gate circuit during a time corresponding to the echo expectation window so as to permit the receiving signal to pass therethrough,
a peak detector having an input side connected to the output side of the gate circuit, and an output side for emitting maximum values of the received signal passed through the gate circuit,
a memory having an input side connected to the output side of the peak detector for writing in maximum values emitted by the peak detector, and a memory output, and
a first calculating unit connected to the memory output, for calculating the center of gravity integral from the maximum values stored in the memory;
said apparatus further comprising a second calculating unit having means for defining the respective gate open time for the gate circuit of each discriminator circuit, the second calculating unit being connected to the edge discriminator and to each gate circuit.

* * * * *